(12) United States Patent
Scott (10) Patent No.: US 7,155,172 B2
(45) Date of Patent: Dec. 26, 2006

(54) RFID RECEIVER APPARATUS AND METHOD

(75) Inventor: Jeffrey Wayne Scott, Pasco, WA (US)

(73) Assignee: Battelle Memorial Institute, Richland, WA (US)

(*) Notice: Subject to any disclaimer, the term of this patent is extended or adjusted under 35 U.S.C. 154(b) by 493 days.

(21) Appl. No.: 10/269,756

(22) Filed: Oct. 10, 2002

(65) Prior Publication Data

US 2004/0203478 A1 Oct. 14, 2004

(51) Int. Cl.
*H04B 7/00* (2006.01)

(52) U.S. Cl. .............. 455/70; 455/88; 340/825.54; 340/572.4

(58) Field of Classification Search .............. 455/70, 455/67.14, 67.15, 67.7, 68, 69, 71, 76, 78, 455/81, 88, 556.2, 557, 168.1, 334, 352; 340/825.54, 825.49, 505, 506, 568, 572.4; 342/42; 375/350, 318, 340, 323

See application file for complete search history.

(56) References Cited

U.S. PATENT DOCUMENTS

| | | | |
|---|---|---|---|
| 2,349,332 A | 9/1994 | Ferguson et al. ............ 340/572 |
| 5,450,492 A | 9/1995 | Hook et al. ................... 380/28 |
| 5,894,266 A * | 4/1999 | Wood et al. ............ 340/539.17 |
| 5,940,006 A * | 8/1999 | MacLellan et al. ......... 340/10.1 |
| 5,986,331 A | 11/1999 | Letavic et al. .............. 257/664 |
| 6,046,683 A | 4/2000 | Pidwerbetsky et al. 340/825.54 |
| 6,108,367 A | 8/2000 | Herman et al. .............. 375/141 |
| 6,184,841 B1 * | 2/2001 | Shober et al. ............... 343/853 |
| 6,236,223 B1 | 5/2001 | Brady et al. ................. 324/765 |
| 6,320,509 B1 * | 11/2001 | Brady et al. ............. 340/572.7 |
| 6,377,203 B1 | 4/2002 | Doany ......................... 342/44 |
| 6,429,775 B1 | 8/2002 | Martinez et al. .......... 340/572.1 |
| 6,639,509 B1 * | 10/2003 | Martinez .................... 340/10.4 |
| 6,686,830 B1 * | 2/2004 | Schirtzer ..................... 340/10.2 |
| 6,738,025 B1 | 5/2004 | Carrender ................... 343/860 |
| 6,745,008 B1 | 6/2004 | Carrender et al. .......... 455/41.1 |
| 6,765,476 B1 | 7/2004 | Steele et al. ................ 340/10.4 |
| 6,797,891 B1 * | 9/2004 | Blair et al. .................. 174/268 |
| 6,867,668 B1 * | 3/2005 | Dagostino et al. ........... 333/246 |
| 6,946,989 B1 * | 9/2005 | Vavik ........................... 342/51 |
| 2002/0149468 A1 | 10/2002 | Carrender et al. ......... 340/5.61 |
| 2002/0149484 A1 * | 10/2002 | Carrender ................. 340/572.4 |
| 2004/0066278 A1 | 4/2004 | Hughes et al. ............. 340/10.1 |
| 2004/0066279 A1 | 4/2004 | Hughes et al. ............. 340/10.1 |
| 2004/0066280 A1 | 4/2004 | Pratt et al. .................. 340/10.2 |
| 2004/0066281 A1 | 4/2004 | Hughes et al. ............. 340/10.2 |
| 2004/0066752 A1 | 4/2004 | Hughes et al. ............... 370/252 |
| 2004/0067764 A1 | 4/2004 | Pratt et al. ................... 455/502 |
| 2004/0070500 A1 | 4/2004 | Pratt et al. ............... 340/572.1 |

OTHER PUBLICATIONS

Product Spec Data Sheet HMC194MS8, "GaAS MMIC MSOP8 SPDT Switch DC—3 Ghz", Hittite Microwave Corporation, No. 7, pp. 52–57 (Feb. 2001).
Product Spec Data Sheet Si4133G, Si4123G/22G/13G/12G, "Dual–Band RF Synthesizer with Integrated VCOs for GSM and GPRS Wireless Communications", Silicon Laboratories, #Si4133G–DS11, Rev. 1.1, 32 pp. (Apr. 2001).
Product Spec Data Sheet, "Crystal Controlled Oscillators", The Connor–Winfield Corp., Datasheet # V.330, Rev. 03; 2 pages (Nov. 6, 2001).

(Continued)

*Primary Examiner*—Tony T. Nguyen
(74) *Attorney, Agent, or Firm*—Wells St. John P.S.

(57) ABSTRACT

An RFID backscatter interrogator for transmitting data to an RFID tag, generating a carrier for the tag, and receiving data from the tag modulated onto the carrier, the interrogator including a single grounded-coplanar wave-guide circuit board and at least one surface mount integrated circuit supported by the circuit board.

52 Claims, 4 Drawing Sheets

OTHER PUBLICATIONS

Product Spec Data Sheet, "Low–Voltage Mixer FM IF System—SA676", Phillips Semiconductors, No. 853–1726 11659 pp. 6–129 through 6–136 (Dec. 15, 1993).

Product Spec Data Sheet, "MXB–0503–3 Surface Mount Mixer", Premier Devices, 1 page (undated).

Product Spec Data Sheet, "MXA–2701–7 Surface Mount Mixer", Premier Devices, 1 page (undated).

Product Spec Data Sheet, "Dual 160 MHz Rail–to–Rail Amplifier AD8042", Analog Devices, Inc., Rev. B, 15 pages (Jul. 2002).

Product Spec Data Sheet HMC287MS8, "GaAs MMIC Low Noise Amplifier with AGC, 2.3–2.5 Ghz", Hittite Microwave Corporation vol. V01.0701, pp. 1–90 through 1–95 (undated).

Product Spec Data Sheet RF2126, "High Power Linear Amplifier", RF Micro–Devices, Rev. A5 010207, pp. 2–73 through 2–78 (undated).

Product Spec Data Sheet, "Xinger Model 1H1304–20 Xinger Directional Couplers", Anaren Microwave, Inc., 1 page (2001).

Product Spec Data Sheet, "RF2046 General Purpose Amplifier", RF Micro–Devices, Rev. A6 020829, pp. 4–173 through 4–178 (undated).

Product Spec Data Sheet HMC414MS8G, "GaAs InGaP HBT MMIC Power Amplifier, 2.2–2.8 Ghz", Hittite Microwave Corporation, vol. V01.1201, pp. 1–214 through 1–221 (undated).

Product Spec Data Sheet, "Si 4133 RF Synthesizer, Dual–Band RF Frequency Synthesizer with Integrated VCOs for Wireless Communications", Silicon Laboratories, Inc., 2 pages (undated).

U.S. Appl. No. 09/588,997, filed Jun. 6, 2000, Gilbert et al.

U.S. Appl. No. 09/588,998, filed Jun. 6, 2000, Carrender et al.

U.S. Appl. No. 09/589,001, filed Jun. 6, 2000, Gilbert et al.

U.S. Appl. No. 10/263,940, filed Oct. 2, 2002, Pratt et al.

U.S. Appl. No. 10/263,809, filed Oct. 2, 2002, Ertin et al.

* cited by examiner

RFID RECEIVER APPARATUS AND METHOD

GOVERNMENT RIGHTS STATEMENT

This invention was made with Government support under Contract DE-AC0676RL01830 awarded by the U.S. Department of the Energy. The Government has certain rights in the invention.

TECHNICAL FIELD

The invention relates to RFID readers. The invention also relates to grounded co-planar wave guide RFID readers. The invention also relates to portable RFID readers.

BACKGROUND OF THE INVENTION

Remote communication utilizing wireless equipment typically relies on radio frequency (RF) technology, which is employed in many industries. One application of RF technology is in locating, identifying, and tracking objects, such as animals, inventory, and vehicles.

RF identification (RFID) tag systems have been developed to identify, monitor, or control remote objects.

An advantage of RFID systems is the non-contact, non-line-of-sight capability of the technology. Tags can be read through a variety of substances such as snow, fog, ice, paint, dirt, and other visually and environmentally challenging conditions where bar codes or other optically-read technologies would be useless. RF tags can also be read at remarkable speeds, in most cases responding in less than one hundred milliseconds.

There are three main categories of RFID tag systems. These are systems that employ beam-powered passive tags, battery-powered semi-passive tags, and active tags. Each operates in fundamentally different ways. The invention described below in the Detailed Description can be embodied in any of these types of systems.

The beam-powered RFID tag is often referred to as a passive device because it derives the energy needed for its operation from the radio frequency energy beamed at it. The tag rectifies the field and changes the reflective characteristics of the tag itself, creating a change in reflectivity (RF cross-section) that is seen at the interrogator. A battery-powered semi-passive RFID tag operates in a similar fashion, modulating its RF cross-section in order to change its reflectivity that is seen at the interrogator to develop a communication link. Here, the battery is the only source of the tag's operational power. Finally, in the active RFID tag, both the tag and reader have transceivers to communicate and are powered by respective batteries.

A typical RF tag system will contain at least one tag and one interrogator. The range of communication for such tags varies according to the transmission power of the interrogator, interrogator receiver sensitivity and selectivity, and backscatter characteristics of the tag. Battery-powered tags operating at 2,450 MHz have traditionally been limited to less than ten meters in range. However, devices with sufficient power can reach in excess of 100 meters in range, depending on the frequency and environmental characteristics.

Conventional continuous wave backscatter RF tag systems utilizing passive (no battery) RF tags require adequate power from a signal from the interrogator to power the internal circuitry in the tag used to modulate the signal back to the interrogator. While this is successful for tags that are located in close proximity to an interrogator, for example less than three meters, this may be insufficient range for some applications, for example greater than 100 meters.

A coplanar waveguide is a transmission line that shares some characteristics with microstrip lines. The characteristic impedance of a coplanar waveguide transmission line is determined by the distributed inductance and the distributed capacitance from the strip to the adjacent groundplane. In a grounded coplanar waveguide, some of the fields go through air, and (ideally) only a small fraction leak to a groundplane. Because some of the fields are in air, there is less loss. Tuning of the dielectric while the circuit is on is possible with no risk of shorts. Large metal top surfaces improve heat sinking, and because the waveguide is grounded, metal and screws can be added for even more heatsinking. The coplanar waveguide can be used to mount components in series and to shunt without need for drilling or use of plated through holes. This makes some circuits possible which would not be possible using plated through holes, if the inductance of plated through holes to the groundplane would be too high. Frequency multipliers are easily used with coplanar waveguides because there is a topside ground to mount diodes in shunt.

Readers or interrogators with good range have been developed by the assignee of the present invention using off-the-shelf packaged and connectorized components coupled together with coaxial interconnects. These readers have very long ranges, but are generally large, stationary, expensive units. A smaller, less expensive unit, with improved manufacturability, is desired.

SUMMARY OF THE INVENTION

The invention provides an interrogator for transmitting data to an RFID tag, generating a carrier for the tag, and receiving data from the tag modulated onto the carrier, the interrogator comprising a single grounded-coplanar waveguide circuit board and at least one surface mount integrated circuit supported by the circuit board.

Another aspect of the invention provide an RFID backscatter interrogator for transmitting data to an RFID tag, generating a carrier for the tag, and receiving data from the tag modulated onto the carrier, the interrogator comprising a synthesizer integrated circuit including first and second RF synthesizers having respective synthesizer outputs; circuitry configured to toggle between the first and second RF synthesizers to effect frequency hopping; an AM/FM radio demodulator integrated circuit; an RF mixer, coupled between the synthesizer integrated circuit and the AM/FM radio demodulator integrated circuit, and configured to mix data with a carrier frequency which the FM demodulator integrated circuit is configured to demodulate; and a single grounded-coplanar wave-guide circuit board supporting at least the synthesizer integrated circuit, the AM/FM radio demodulator IC, and the RF mixer.

Another aspect of the invention provides an RFID backscatter system comprising an interrogator for transmitting data to an RFID tag, generating a carrier for the tag, and receiving data from the tag modulated onto the carrier, the interrogator comprising a single grounded-coplanar waveguide circuit board and at least one surface mount integrated circuit supported by the circuit board; and a tag in selective backscatter communication with the interrogator.

Another aspect of the invention provides an RFID backscatter interrogator for transmitting data to an RFID tag, generating a carrier for the tag, and receiving data from the tag modulated onto the carrier, the interrogator comprising a transmitter including: a synthesizer integrated circuit including first and second RF synthesizers having respective synthesizer outputs; at least one RF switch coupled to the synthesizer integrated circuit; and at least one RF power amplifier coupled to the RF switch, wherein a transmitter is defined comprising the synthesizer integrated circuit, RF switch, and RF power amplifier, the power amplifier defining a local oscillator; and a receiver including: a low noise amplifier; circuitry coupled to the local oscillator defined by the power amplifier and configured to cancel a carrier from a signal received by the low noise amplifier; an AM/FM radio demodulator integrated circuit; and an RF mixer, coupled between the synthesizer integrated circuit and the AM/FM radio demodulator integrated circuit, and configured to mix data with a carrier frequency which the AM/FM demodulator integrated circuit is configured to demodulate.

Another aspect of the invention provides an RFID backscatter interrogator for transmitting data to an RFID tag, generating a carrier for the tag, and receiving data from the tag modulated onto the carrier, the interrogator comprising a synthesizer integrated circuit including first and second RF synthesizers having respective synthesizer outputs; an AM/FM radio demodulator integrated circuit; and an RF mixer, coupled between the synthesizer integrated circuit and the AM/FM radio demodulator integrated circuit, and configured to mix data with a carrier frequency which the FM demodulator integrated circuit is configured to demodulate.

Another aspect of the invention provides a dual band RFID backscatter interrogator for transmitting data to an RFID tag, generating a carrier for the tag, and receiving data from the tag modulated onto the carrier, the interrogator comprising a transmitter including: a synthesizer integrated circuit including first and second RF synthesizers having respective synthesizer outputs; a first section configured for transmission at a first frequency, including at least one RF switch switchably coupled to the synthesizer integrated circuit; and at least one RF power amplifier coupled to the RF switch, wherein a transmitter is selectively defined including the synthesizer integrated circuit, RF switch, and RF power amplifier; a second section configured for transmission at a second frequency different from the first frequency, including at least one RF switch switchably coupled to the synthesizer integrated circuit; and at least one RF power amplifier coupled to the RF switch of the second section, wherein a transmitter is selectively defined including the synthesizer integrated circuit, RF switch of the second section, and RF power amplifier of the second section; and a receiver including a third section configured for receiving backscatter at the first frequency, including a low noise amplifier; circuitry coupled to the at least one power amplifier of the first section and configured to cancel a carrier from a signal received by the low noise amplifier; an AM/FM radio demodulator integrated circuit; and an RF mixer, coupled between the synthesizer integrated circuit and the AM/FM radio demodulator integrated circuit, and configured to mix data with a carrier frequency which the FM demodulator integrated circuit is configured to demodulate; and a fourth section configured for receiving backscatter at the second frequency, including a low noise amplifier; circuitry coupled to the at least one power amplifier of the second section and configured to cancel a carrier from a signal received by the low noise amplifier of the fourth section; an AM/FM radio demodulator integrated circuit; and an RF mixer, coupled between the synthesizer integrated circuit and the AM/FM radio demodulator integrated circuit of the fourth section, and configured to mix data with a carrier frequency which the FM demodulator integrated circuit of the fourth section is configured to demodulate.

Another aspect of the invention provides a dual band RFID backscatter interrogator for transmitting data to an RFID tag, generating a carrier for the tag, and receiving data from the tag modulated onto the carrier, the interrogator comprising a transmitter including: a synthesizer integrated circuit including first and second RF synthesizers having respective synthesizer outputs and used in operation for communication in a selected one of at least first and second RF bands; at least one RF switch coupled to the synthesizer integrated circuit; and at least one RF power amplifier coupled to the RF switch, wherein a transmitter is defined comprising the synthesizer integrated circuit, RF switch, and RF power amplifier; and a receiver including: a low noise amplifier; circuitry coupled to the at least one power amplifier and configured to cancel a carrier from a signal received by the low noise amplifier; an AM/FM radio demodulator integrated circuit; and an RF mixer, coupled between the synthesizer integrated circuit and the AM/FM radio demodulator integrated circuit, and configured to mix data with a carrier frequency which the FM demodulator integrated circuit is configured to demodulate; wherein the at least one RF switch, at least one RF power amplifier, low noise amplifier, circuitry configured to cancel a carrier, RF mixer, and AM/FM demodulator are broadbanded to cover the at least first and second bands.

BRIEF DESCRIPTION OF THE DRAWINGS

Preferred embodiments of the invention are described below with reference to the following accompanying drawings.

DETAILED DESCRIPTION OF THE PREFERRED EMBODIMENTS

Attention is directed to the following commonly assigned patent applications, which are incorporated herein by reference: U.S. patent application Ser. No. 10/263,826 entitled "Radio Frequency Identification Device Communications Systems, Wireless Communication Devices, Wireless Communication Systems, Backscatter Communication Methods, A Radio Frequency Identification Device and A Radio Frequency Identification Device Communication Method" by inventors Mike A. Hughes and Richard M. Pratt; U.S. patent application Ser. No. 10/263,809, entitled "Method of Simultaneously Reading Multiple Radio Frequency Tags, RF Tag, and RF Reader", by inventors Emre Ertin, Richard M. Pratt, Mike A. Hughes, Kevin L. Priddy, and Wayne M. Lechelt; U.S. patent application Ser. No. 10/264,078 entitled "System and Method to Identify Multiple RFID Tags", by inventors Mike A. Hughes and Richard M. Pratt; U.S. patent application Ser. No. 10/263,940 entitled "Wireless Communication Devices, Radio Frequency Identification Devices, Backscatter Communication Device Wake-Up Methods, Communication Device Wake-Up Methods and A Radio Frequency Identification Device Wake-Up Method", by inventors Richard Pratt and Mike Hughes; U.S. patent application Ser. No. 10/263,997 entitled "Wireless Communication Systems, Radio Frequency Identification Devices, Methods of Enhancing a Communications Range of a Radio Frequency Identification Device, and Wireless Communication Methods", by inventors Richard Pratt and Steven B. Thompson; U.S. patent application Ser. No. 10/263,670 entitled "Wireless Communications Devices, Methods of Processing a Wireless Communication Signal, Wireless Communication Synchronization Methods and a Radio Frequency Identification Device Communication Method", by inventors Richard M. Pratt and Steven B. Thompson; U.S. patent application Ser. No. 10/263,656 entitled "Wireless Communications Systems, Radio Frequency Identification Devices, Wireless Communications Methods, and Radio Frequency Identification Device Communications Methods", by inventors Richard Pratt and Steven B. Thompson; U.S. Patent Application Ser. No. 10/263,635 entitled "A Challenged-Based Tag Authentication Model, by inventors Mike A. Hughes" and Richard M. Pratt; U.S. patent application Ser. No. 09/589,001, filed Jun. 6, 2000, entitled "Remote Communication System and Method", by inventors R. W. Gilbert, G. A. Anderson, K. D. Steele, and C. L. Carrender; U.S. patent application Ser. No. 09/802,408; filed Mar. 9, 2001, entitled "Multi-Level RF Identification System"; by inventors R. W. Gilbert, G. A. Anderson, and K. D. Steele; U.S. patent application Ser. No. 09/833,465, filed Apr. 11, 2001, entitled "System and Method for Controlling Remote Device", by inventors C. L. Carrender, R. W. Gilbert, J. W. Scott, and D. Clark; U.S. patent application Ser. No. 09/588,997, filed Jun. 6, 2000, entitled "Phase Modulation in RF Tag", by inventors R. W. Gilbert and C. L. Carrender; U.S. patent application Ser. No. 09/589,000, filed Jun. 6, 2000, entitled "Multi-Frequency Communication System and Method", by inventors R. W. Gilbert and C. L. Carrender; U.S. patent application Ser. No. 09/588,998; filed Jun. 6, 2000, entitled "Distance/Ranging by Determination of RF Phase Delta", by inventor C. L. Carrender; U.S. patent application Ser. No. 09/797,539, filed Feb. 28, 2001, entitled "Antenna Matching Circuit", by inventor C. L. Carrender; U.S. patent application Ser. No. 09/833,391, filed Apr. 11, 2001, entitled "Frequency Hopping RFID Reader", by inventor C. L. Carrender.

Figure 1:
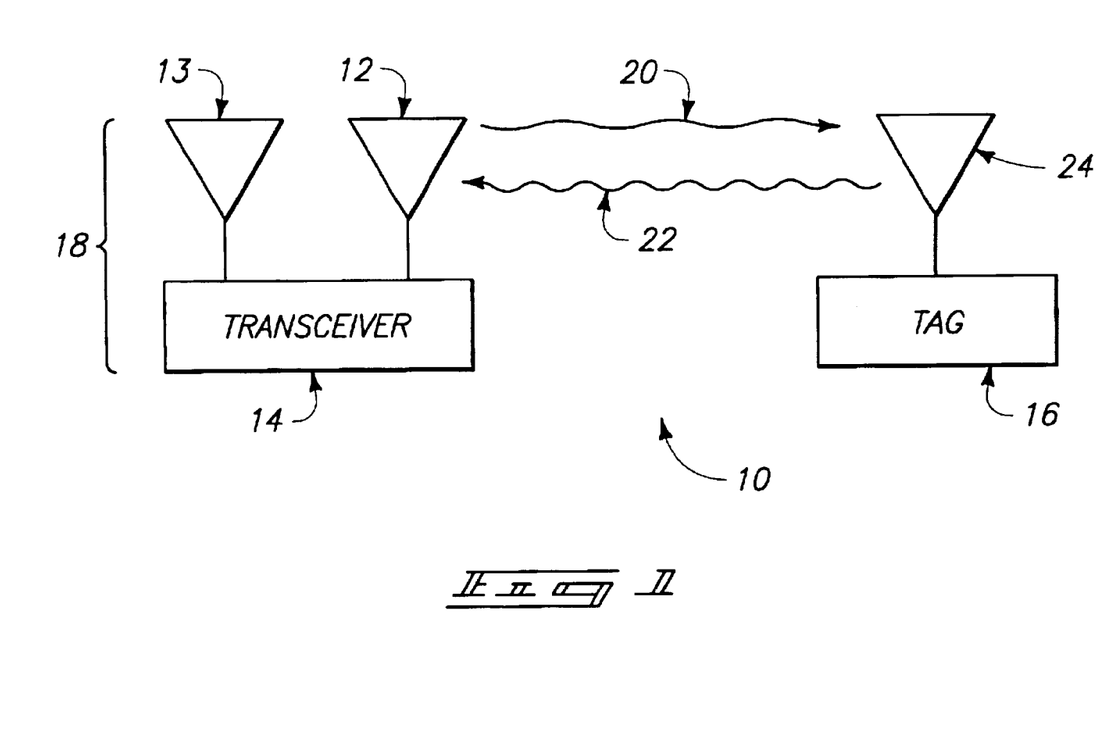
FIG. 1 is a block diagram of a conventional RFID communication system, including a tag and reader in which the invention could be incorporated.

As shown in FIG. 1, an RFID system 10 includes an interrogator or reader 18 and transponders (commonly called RF tags) 16. The interrogator 18 includes a transceiver with decoder 14 and one or more antennas, such as a transmit antenna 12 and receive antenna 13. The tag 16 includes an antenna 24. In operation, the transmit antenna 12 emits and the receive antenna 13 receives electromagnetic radio signals generated by the transceiver 14 to activate the tag 16, and receive signals from the tag 16. When the tag 16 is activated, data can be read from or written to the tag 16.

In some applications, the transceiver 14 and antenna 12 are components of an interrogator (or reader) 18, which can be configured either as a hand-held or a fixed-mount device. The interrogator 18 emits the radio signals 20 in range from one inch to one hundred feet or more, depending upon its power output, the radio frequency used, and other radio frequency considerations. When an RF tag 16 passes through the electromagnetic radio waves 20, the tag detects the signal 20 and is activated. Data encoded in the tag 16 is then transmitted by a modulated data signal 22 through the antenna 24 to the interrogator 18 for subsequent processing.

The system 10 utilizes continuous wave backscatter to communicate data from the tag 16 to the interrogator 18. More specifically, the interrogator 18 transmits a continuous-wave radio signal to the tag 16, which modulates the signal 20 using modulated backscattering wherein the electrical characteristics of the antenna 24 are altered by a modulating signal from the tag that reflects a modulated signal 22 back to the interrogator 18. The modulated signal 22 is encoded with information from the tag 16. The interrogator 18 then demodulates the modulated signal 22 and decodes the information.

Figure 2:
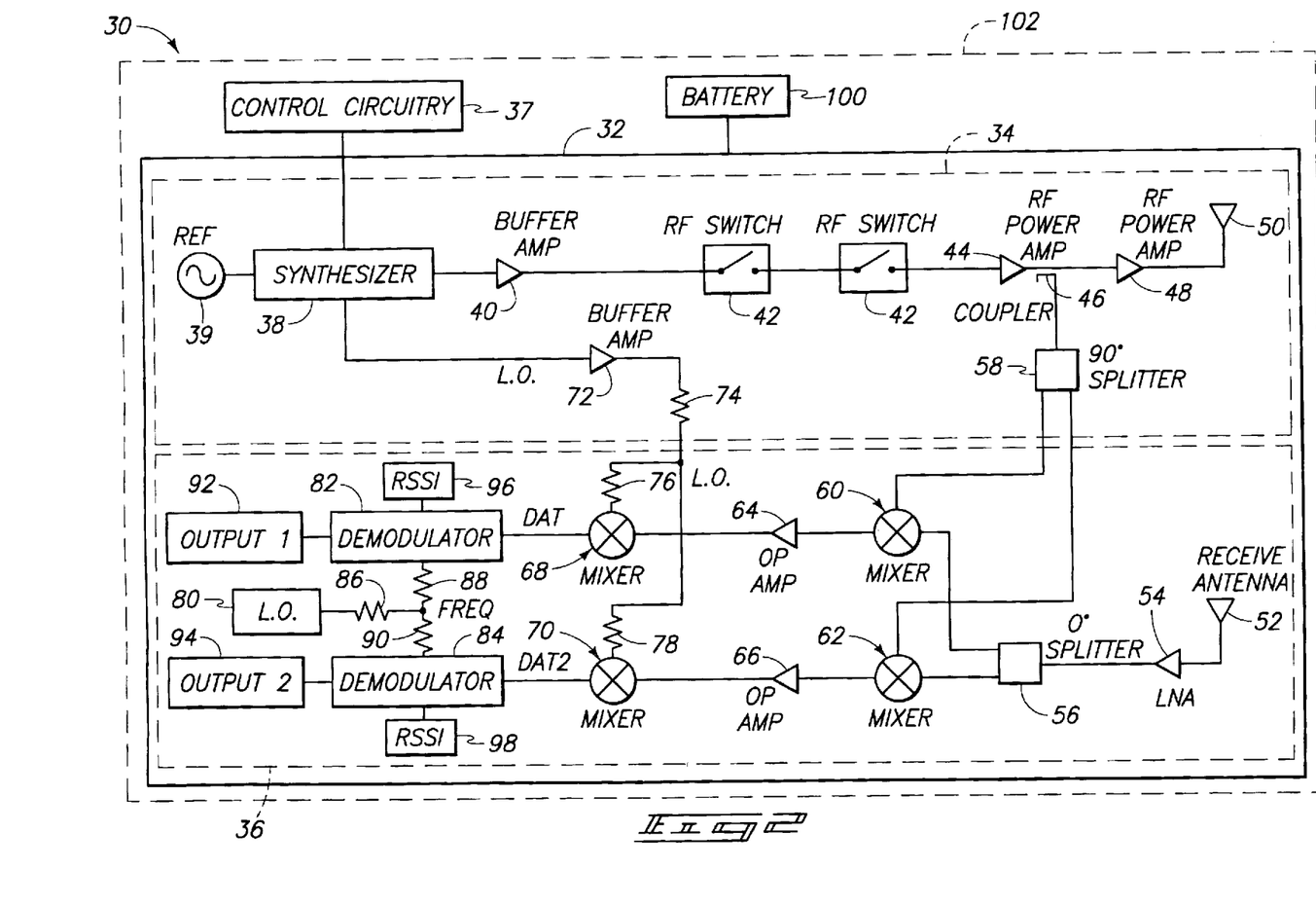
FIG. 2 is a circuit schematic of an RFID reader embodying various aspects of the invention.

FIG. 2 is a circuit schematic of an RF reader 30 embodying various aspects of the invention. The RF reader 30 of FIG. 2 could be used in place of the interrogator 18 of FIG. 1. In the illustrated embodiment, most major components of the RF reader 30 are included on a single printed circuit board 32. More particularly, in the illustrated embodiment, the printed circuit board is a grounded co-planar wave guide (GCPWG) circuit board. This is a different technology than the technology that is typically used for a radio frequency printed circuit boards. Both micro-strip and grounded co-planar wave guide technologies have advantages over off the shelf, packaged technologies. They allow boards to be layed out as desired and tailored to a particular application. There are also large cost savings. Some packaged parts costing, for example, in the order of $200 or $500 can be replaced with surface mount parts costing in the order of $1.50 or $3. GCPWG technology allows for better performance and lower size and cost, even over micro-strip technology.

The disclosed GCPWG design provides many advantages over traditional micro-strip techniques. GCPWG circuits are physically smaller in size for a given frequency, and offer greater noise immunity from on-board and off-board sources. GCPWG technology provides for easier transitions from surface mount devices to transmission lines on the printed circuit board while maintaining proper circuit impedance. With proper circuit impedance more closely maintained, transmission lines radiate less RF energy from the board, which makes the disclosed circuitry less susceptible to disturbance from the environment and less likely to cause any disturbance to adjacent circuitry.

In the illustrated embodiment, the reader 30 operates in the ISM (Instrument, Scientific and Medical) band. The ISM Band is an unlicensed publicly owned part of the radio spectrum in the 900 MHz, 2.4 GHz and 5 GHz ranges. Variations of the reader 30 designed with GCPWG techniques can be advantageously used for any desired microwave ISM (Instrument, Scientific and Medical) range, e.g. 902 MHz to 928 MHz, 2.465 GHz to 2.4835 GHz and 5.785 GHz to 5.815 GHz. The ISM band provide advantages in that FCC (federal communication commission) licensing is not required. The reader 30 can be modified for use at frequencies outside the ISM band, if desired, for use in different countries or if licensing requirements are not a concern. Utilizing the disclosed GCPWG RFID reader at any frequency will allow for efficient RF board designs. GCPWG designs are more suited to smaller high performance stationary readers and high performance hand held readers than micro-strip designs or designs that utilize pre-packaged RF parts.

The reader 30 includes a transmit section 34 and a receive section 36. Some components could be described as being used by both a receive section or a transmit section, or arguably should be classified as belonging in a different section than shown. It should be kept in mind that the illustrated division between receive section 36 and transmit section 34 is a rough generalization. To better enable one of ordinary skill in the art to make and use the invention without undue experimentation, part numbers will be provided for one preferred embodiment of the invention. It should be kept in mind that alternative components from alternative manufacturers could be used. Additionally, functionality of one integrated circuit could be obtained by combining two or more integrated circuits or components; conversely, it is possible that functionality of two or more integrated circuits illustrated could be combined in an alternative single integrated circuit.

The transmit section 34 includes a synthesizer 38. The synthesizer 38 receives a reference signal from a reference generator 39 and performs frequency synthesis. In the illustrated embodiment, the synthesizer 38 is a single integrated circuit that includes two RF synthesizers that can be set independently of each other. In the illustrated embodiment, the synthesizer 38 is an integrated circuit designated Si4133 and sold by Silicon Laboratories, Inc., 4635 Boston Lane, Austin, Tex. 78735.

The Si4133 is a monolithic integrated circuit that performs IF and dual-band RF frequency synthesis for wireless communications applications. The Si4133 includes three voltage-controlled oscillators, loop filters, reference and VCO dividers, and phase detectors. This reduces the need for external components. This integrated circuit is more typically used in applications such as cell phones and wireless LANs.

In the illustrated embodiment, the output of the synthesizer is toggled for faster frequency hopping operations than with present readers. More particularly, as one synthesizer is being used to transmit, a new frequency is set up in the other synthesizer. Then a toggling between synthesizers takes place and a new frequency can be set up again. One synthesizer is used for transmitting while the other is set up for the next transmit frequency. Frequency hopping is used for FCC reasons, so that no one frequency is used for too long, so as to avoid causing interference, and to avoid jamming by other interfering devices. Frequency hopping generally means using different carrier frequencies at different times. The carrier will hop around within an ISM band so that an interfering signal will hopefully be avoided at some frequencies. Frequency hopping is particularly useful in the 2.45 GHz band because of the leakages from microwave ovens. In one embodiment, control circuitry 37 is provided to cause the synthesizer 38 to frequency hop. In the illustrated embodiment, the control circuitry 37 is located on a separate digital board.

The transmit section 34 further includes a buffer amplifier 40 having an input coupled to an RF output of the synthesizer 38 and having an output. The buffer amplifier adds isolation. In the illustrated embodiment, the buffer amplifier 40 is an integrated circuit designated RF2046 and sold by RF Micro Devices, Inc., 7625 Thorndike Road, Greensboro, N.C. 27409.

The transmit section 34 further includes one or more RF switches 42 having an input coupled to the output of the buffer amplifier and having an output. In the illustrated embodiment, two RF switches are provided that are turned on and off together. Two switches are provided for increased isolation. In the illustrated embodiment, each RF switch 42 is an integrated circuit designated HMC194MS8 and sold by Hittite Microwave Corporation, 12Elizabeth Drive, Chelmsford, Mass. 01824.

The transmit section 34 further includes a first power amplifier 44 having an input coupled to the output of the RF switches 42 and having an output. In the illustrated embodiment, the power amplifier 44 is an integrated circuit designated HMC414MS8G and sold by Hittite Microwave Corporation, 12 Elizabeth Drive, Chelmsford, Mass 01824.

The transmit section 34 further includes a directional RF coupler 46 having an input coupled to the output of the first power amplifier 44 and having an output defining a local oscillator. In the illustrated embodiment, the RF coupler 46 is an integrated circuit designated 1H1304-20, and sold under the brand name Xinger by Anaren Microwave, Inc., 6635 Kirkville Road, East Syracuse, N.Y. 13057. Part of the output from the first power amplifier 44 is coupled off through the directional coupler 46. Power level is reduced and a signal is provided to the receive section 36 for a first downconversion, which will be described below.

The transmit section 34 may further include a second power amplifier 48. If amplification up to a desired level can be obtained using the first amplifier 44, the second amplifier 48 can be omitted. When included, the second power amplifier 48 receives the rest of the output from the first power amplifier, via the coupler 46. The second power amplifier amplifies up for transmission at up to about 1 Watt, for conformance with FCC part 15 rules. Other output power levels could be used as desired. For example, different power levels may be appropriate in different countries. In the illustrated embodiment, the second power amplifier 48 is a high power linear amplifier integrated circuit designated RF2126 and sold by RF Micro Devices, Inc., 7625 Thorndike Road, Greensboro, N.C. 27409.

The transmit section 34 further includes a transmit antenna 50 coupled to the second power amplifier 48. While other antenna designs could be employed, in the illustrated embodiment the antenna 50 is a fractal array.

The receive section 36 includes a receive antenna 52. In the illustrated embodiment, the receive antenna 52 is substantially similar to the transmit antenna 50; however, in alternative embodiments, different antenna designs could be used for the transmit and receive antennas.

The receive section 36 further includes a low noise amplifier 54 having an input coupled to the antenna 52 and having an output. The low noise amplifier 54 boosts the signal received by the receive antenna 52. In the illustrated embodiment, the low noise amplifier 54 is an integrated circuit designated HMC287MS8 and sold by Hittite Microwave Corporation, 12Elizabeth Drive, Chelmsford, Mass. 01824.

The receive section 36 further includes a 0 degrees splitter 56 having an input coupled to the output of the low noise amplifier 54 and having two outputs. The splitter 56 produces two signals that are in phase.

A 90 degrees splitter 58, on the board 30, has an input coupled to the coupler 46 and has two outputs, 90 degrees apart. The splitter 58 thus produces a phase shift for one of the outputs relative to the input.

The receive section 36 further includes mixers 60 and 62 having respective inputs and outputs. The mixer 60 receives a signal from one of the outputs of the 90 degree splitter and a signal from one of the outputs of the 0 degrees splitter. The mixer 62 receives a signal from the other of the outputs of the 90 degree splitter and a signal from one of the outputs of the 0 degrees splitter. In the mixer 60 that gets the two original in-phase signals, the portion of the coupled off transmit signal (the reference signal) and the in-phase receive signal, the output of this mixer is still relatively in-phase with the original transmit signal. In the mixer 62 that gets the portion of the coupled off transmit signal that has been shifted in phase by 90 degrees and the other in phase receive signal, the output of this mixer 62 is 90 degrees off of the other. It either leads or lags the other by 90 degrees.

At the first downconversion mixers 60 and 62, the reflected carrier with the data modulation on it from the tag is mixed with the coupled off portion of the transmit signal. Because the two carriers are essentially the same, they mostly cancel, leaving just the modulation. There is also some ambient noise and sometimes some components of the carrier left over; however, because the output of the mixers (the data) is at a lower frequency and the rest of the circuit is tuned for this lower frequency and not 2.45 GHz, problems are avoided in having any of the 2.45 GHz get through to the rest of the circuit.

In the illustrated embodiment, the mixers are respective integrated circuits designated MXA-2701-7 and sold by Premier Devices, Inc., 1860 Hartog Dr., San Jose, Calif. 95131.

The receive section 36 further includes an op-amp 64 coupled to the output of the mixer 60, and an op-amp 66 coupled to the output of the mixer 62. In one embodiment, the op-amps 64 and 66 are defined by a dual op-amp integrated circuit designated AD8042AR and sold by Analog Devices, Inc., Three Technology Way, Norwood, Mass. 02062.

The receive section 36 further includes mixers 68 and 70, having respective inputs and outputs. The mixer 68 receives one input signal from the output of the op-amp 64. The mixer 68 receives another input signal from a local oscillator (L.O.) output of the synthesizer 38, via a buffer amp 72 on the board 32, and a resistive divider defined by resistors 74, 76, and 78 on the board 32. The mixer 70 receives one input signal from the output of the op-amp 66. The mixer 70 receives another input signal from a local oscillator (L.O.) output of the synthesizer 38, via a buffer amp 72 on the board 32, and the resistive divider defined by the resistors 74, 76, and 78 on the board 32. These mixers 68 and 70 are used for upconverting data signals from the op amps 64 and 66, respectively, to a frequency that can be used by demodulators 82 and 84 that will be described below in more detail. In the illustrated embodiment, the mixers 68 and 70 are respective integrated circuits designated MXB-0503-3 and sold by Premier Devices, Inc., 1860 Hartog Dr., San Jose, Cailf. 95131.

The receive section 36 further includes a local oscillator 80. In the illustrated embodiment, the local oscillator 80 is a 77.76 MHz local oscillator. More particularly, in the illustrated embodiment, the local oscillator 80 is a voltage controlled crystal oscillator integrated circuit designated VSLD55JC and sold by Connor-Winfield Corp., 2111 Comprehensive Dr., Aurora, Ill., 60505. According to the manufacturer, this integrated circuit is designed for phased lock loop applications requiring low jitter and tight stability.

The receive section 36 further includes demodulators 82 and 84. The demodulator 82 has an input coupled to the output of the mixer 68, and an input coupled to the local oscillator 80 via a resistive divider defined by resistors 86, 88, and 90. The demodulator 84 has an input coupled to the output of the mixer 70, and an input coupled to the local oscillator 80 via the resistive divider defined by resistors 86, 88, and 90. In the illustrated embodiment, the demodulators 82 and 84 are respective integrated circuits designated SA676 and sold by Philips Semiconductors, Eindhoven, Netherlands. The demodulators 82 and 84 generate first and second outputs 92 and 94 (commonly referred to as I and Q outputs; i.e., in-phase and quadrature outputs).

The SA676 integrated circuit includes a mixer (its front end). This mixer is used, in the illustrated embodiment, as a down-converter. The mixer mixes an incoming data signal that is riding on a carrier frequency compatible with the frequency input requirements of the SA676 integrated circuit with the output of the local oscillator 80, which in the illustrated embodiment is 77.76 MHz. The resulting down-conversion is a 455 KHz carrier with the desired data on it. This is then amplified within the SA676 integrated circuit and then data is detected through the use of a quadrature detector within the SA676 integrated circuit. The detected data is then pinned out of the SA676 integrated circuit as audio. This same signal is also run through a comparator within the SA676 integrated circuit and pinned out as a Received Signal Strength Indicator (RSSI) 96 or 98. The Received Signal Strength Indicator (RSSI) output is used, in one embodiment, for dynamic gain control of one or more of: LNA Gain, Receive Gain, Transmit Gain or a combination. In one embodiment, the dynamic gain control is performed by the control circuitry 37.

There is 90 degrees of phase difference between the outputs 92 and 94 so that when one channel (I or Q) is in a quadrature null, the other channel is not and has good data on it. In one embodiment, these two outputs 92 and 94 are summed or X-OR'ed so that a constant reliable data steam is realized. More particularly, in one embodiment, the two outputs are summed or X-OR'ed external of the board 32. In one embodiment, the two outputs are summed or X-OR'ed by the control circuitry 37.

In one embodiment, the reader 30 is a portable, handheld reader, and further includes a battery 100 coupled to supply power to the various integrated circuits of the board 32. In one embodiment, a housing 102 supports the battery and encloses at least a portion of the circuit board 32. In alternative embodiments, the reader uses AC power (e.g., includes a transformer) and is portable or stationary.

While a specific design has been disclosed for a 2450 MHz reader, all the above described integrated circuits are also available for the 915 MHz ISM band. An alternative embodiment provides a 915 MHz reader of similar size, function, and construction for utilization with tags that operate in the 915 MHz ISM band. Other alternative frequencies are also possible, though different specific circuitry would be employed and functions may have to be moved from the specific blocks disclosed to other or additional blocks.

Figure 3:
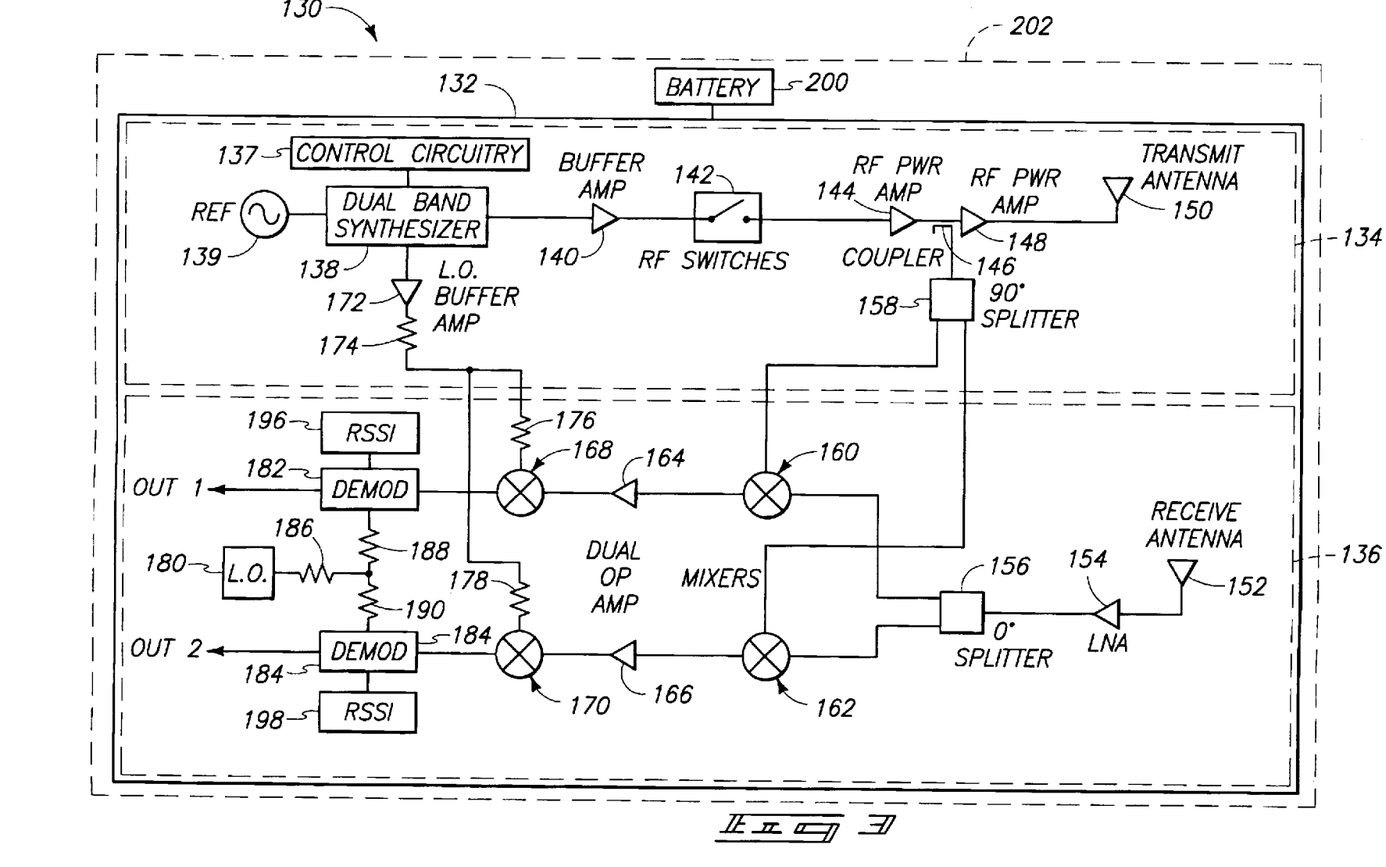
FIG. 3 is a circuit schematic of an RFID reader in accordance with one alternative embodiment.
Figure 4:
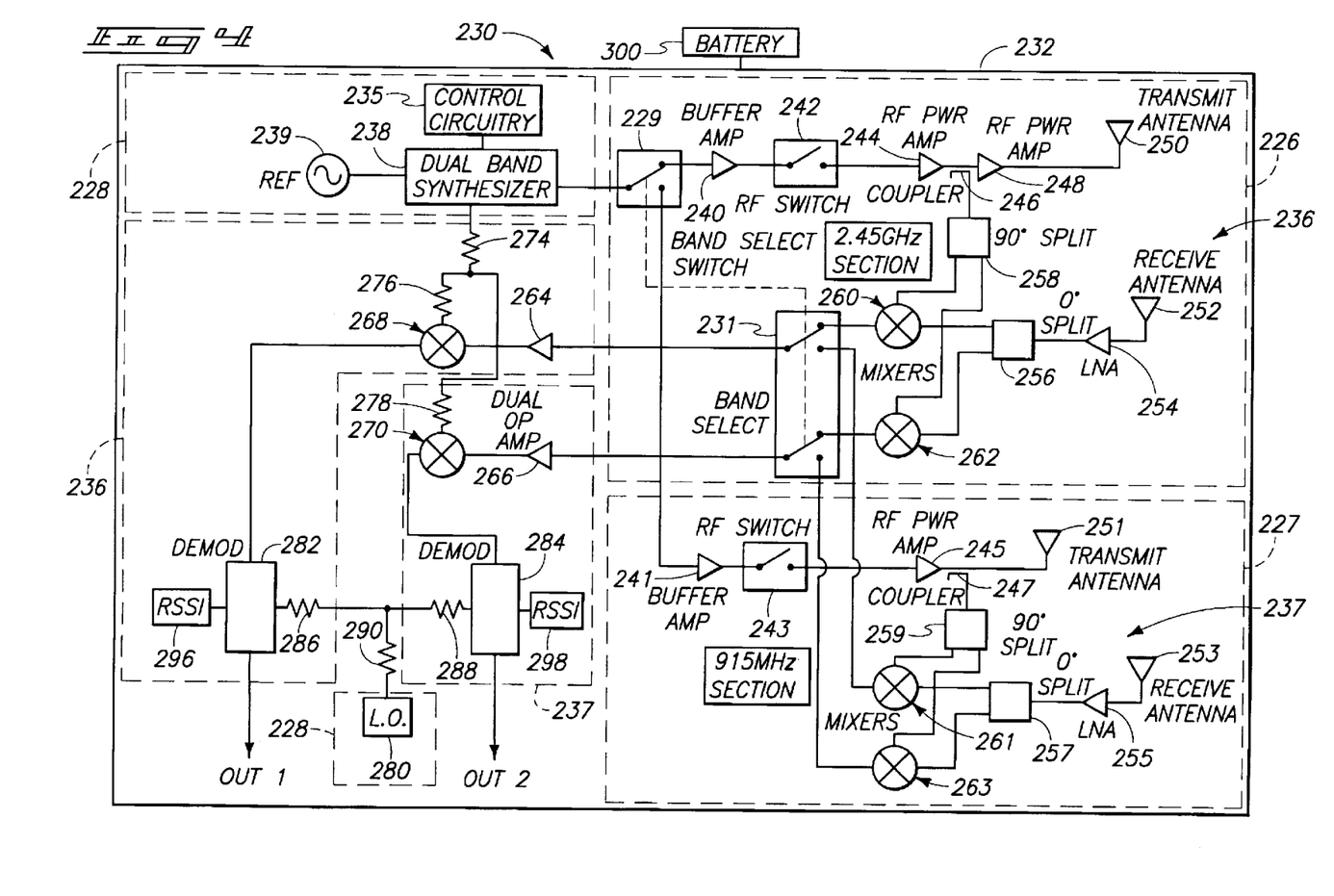
FIG. 4 is a circuit schematic of an RFID reader in accordance with another alternative embodiment of the invention.

FIGS. 3 and 4 are circuit schematics of RFID readers in accordance with alternative embodiments. More particularly, FIGS. 3 and 4 illustrate dualband GCPWG readers. A dual band reader can be constructed in a variety of ways.

The RF reader 130 of FIG. 3 could be used in place of the interrogator 18 of FIG. 1. In the illustrated embodiment, most major components of the RF reader 130 are included on a single printed circuit board 132. More particularly, in the illustrated embodiment, the printed circuit board is a grounded co-planar wave guide (GCPWG) circuit board, like the embodiment of FIG. 2.

The reader 130 includes a transmit section 134 and a receive section 136. It should be kept in mind that the illustrated division between receive section 136 and transmit section 134 is a rough generalization.

The transmit section 134 includes a synthesizer 138. The synthesizer 138 receives a reference signal from a reference generator 139 and performs frequency synthesis. In the illustrated embodiment, the synthesizer 138 is a single integrated circuit that includes two RF synthesizers that can be set independently of each other.

The transmit section 134 further includes a buffer amplifier 140 having an input coupled to an RF output of the synthesizer 138 and having an output. The buffer amplifier adds isolation.

The transmit section 134 further includes one or more RF switches 142 having an input coupled to the output of the buffer amplifier and having an output. In the illustrated embodiment, it is assumed that two RF switches (one switch 142 is shown) are provided that are turned on and off together. Two switches are provided for increased isolation.

The transmit section 134 further includes a first power amplifier 144 having an input coupled to the output of the RF switches 142 and having an output.

The transmit section 134 further includes a directional RF coupler 146 having an input coupled to the output of the first power amplifier 144 and having an output. Part of the output from the first power amplifier 144 is coupled off through the directional coupler 146. Power level is reduced and a signal is provided to the receive section 136 for a first downconversion, which will be described below.

The transmit section 134 may further include a second power amplifier 148. If amplification up to a desired level can be obtained using the first amplifier 144, the second amplifier 148 can be omitted. If included, the second power amplifier 148 receives the rest of the output from the first power amplifier, via the coupler 146. The second power amplifier provides increased power for transmission.

The transmit section 134 further includes a transmit antenna 150 coupled to the second power amplifier 148.

The receive section 136 includes a receive antenna 152. Broad band, dual band, or individual band antennas are used in alternative designs, each having their own merits. Antennas can be selectively physically switched out by a user, as desired, in one embodiment.

The receive section 136 further includes a low noise amplifier 154 having an input coupled to the antenna 152 and having an output. The low noise amplifier 154 boosts the signal received by the receive antenna 152.

The receive section 136 further includes a 0 degrees splitter 156 having an input coupled to the output of the low noise amplifier 154 and having two outputs. The splitter 156 produces two signals that are in phase.

A 90 degrees splitter 158, on the board 130, has an input coupled to the coupler 146 and has two outputs, 90 degrees apart. The splitter 158 thus produces a phase shift for one of the outputs relative to the input.

The receive section 136 further includes mixers 160 and 162 having respective inputs and outputs. The mixer 160 receives a signal from one of the outputs of the 90 degree splitter and a signal from one of the outputs of the 0 degrees splitter. The mixer 162 receives a signal from the other of the outputs of the 90 degree splitter and a signal from one of the outputs of the 0 degrees splitter. In the mixer 60 that gets the two original in-phase signals, the portion of the coupled off transmit signal (the reference signal) and the in-phase receive signal, the output of this mixer is still relatively in-phase with the original transmit signal. In the mixer 162 that gets the portion of the coupled off transmit signal that has been shifted in phase by 90 degrees and the other in phase receive signal, the output of this mixer 162 is 90 degrees off of the other. It either leads or lags the other by 90 degrees.

At the first downconversion mixers 160 and 162, the reflected carrier with the data modulation on it from the tag is mixed with the coupled off portion of the transmit signal. Because the two carriers are essentially the same, they mostly cancel, leaving just the modulation.

The receive section 136 further includes an op-amp 164 coupled to the output of the mixer 160, and an op-amp 166 coupled to the output of the mixer 162.

The receive section 136 further includes mixers 168 and 170, having respective inputs and outputs. The mixer 168 receives one input signal from the output of the op-amp 164. The mixer 168 receives another input signal from a local oscillator (L.O.) output of the synthesizer 138, via a buffer amp 172 on the board 132, and, e.g., a resistive divider defined by resistors 174,176, and 178 on the board 132. The mixer 170 receives one input signal from the output of the op-amp 166. The mixer 170 receives another input signal from a local oscillator (L.O.) output of the synthesizer 138, via a buffer amp 172 on the board 132, and, e.g., the resistive divider defined by the resistors 174,176, and 178 on the board 132. These mixers 168 and 170 are used for upconverting data signals from the op amps 164 and 166, respectively, to a frequency that can be used by demodulators 182 and 184 that will be described below in more detail.

The receive section 136 further includes a local oscillator 180. In the illustrated embodiment, the local oscillator 180 is a voltage controlled crystal oscillator.

The receive section 136 further includes demodulators 182 and 184. The demodulator 182 has an input coupled to the output of the mixer 168, and an input coupled to the local oscillator 180 via, e.g., a resistive divider defined by resistors 186, 188, and 190. The demodulator 184 has an input coupled to the output of the mixer 170, and an input coupled to the local oscillator 180 via, e.g., the resistive divider defined by resistors 186, 188, and 190. In the illustrated embodiment, the demodulators 182 and 184 generate first and second outputs (commonly referred to as I and Q outputs; i.e., in-phase and quadrature outputs). The demodulators 182 and 184 include mixers that are used, in the illustrated embodiment, as down-converters. The demodulators 182 and 184 further produce a Received Signal Strength Indicator (RSSI) 196 or 198. The Received Signal Strength Indicator (RSSI) output is used, in one embodiment, for dynamic gain control of one or more of: LNA Gain, Receive Gain, Transmit Gain or a combination. In one embodiment, the dynamic gain control is performed by the control circuitry 137.

There is 90 degrees of phase difference between the outputs from the demodulators 182 and 184 so that when one channel (I or Q) is in a quadrature null, the other channel is not and has good data on it. In one embodiment, these two outputs are summed or X-OR'ed so that a constant reliable data steam is realized. In one embodiment, the two outputs are summed or X-OR'ed by the control circuitry 137.

In the embodiment shown in FIG. 3, the front end RF components are broadbanded to cover both bands and the synthesizer 138 is a dual band synthesizer. In the embodiment shown in FIG. 3, the synthesizer has an output in the 2450 MHz band, an output in the 915 band, and a local oscillator output.

The reader 130 is a portable, handheld reader, and further includes a battery 200 coupled to supply power to components of the board 132. In one embodiment, a housing 202 supports the battery and encloses at least a portion of the circuit board 132. In alternative embodiments, the reader uses AC power (e.g., includes a transformer) and is portable or stationary.

In the embodiment of FIG. 3, maximum performance in each individual band is not realized due to the broadband design, but the performance may be acceptable for applications that do not require maximum performance but do require a reader that can read tags that operate in two different bands; e.g., 2450 MHz and 915 MHz. A reader that is compact and full featured is realized.

An alternative dual band embodiment, shown in FIG. 4, also uses a dual band synthesizer, and has different front ends for different bands, and involves actively switching between the different front ends as required by the application.

The RF reader 230 of FIG. 4 could be used in place of the interrogator 18 of FIG. 1. In the illustrated embodiment, most major components of the RF reader 230 are included on a single printed circuit board 232. More particularly, in the illustrated embodiment, the printed circuit board is a grounded co-planar wave guide (GCPWG) circuit board, like the embodiment of FIG. 2.

The reader 230 includes a first frequency section (e.g., 2.45 GHz), a second frequency section (e.g., 915 MHz), and a common section 228.

The common section 228 includes a synthesizer 238. The synthesizer 238 receives a reference signal from a reference generator 239 and performs frequency synthesis. In the illustrated embodiment, the synthesizer 238 is a single integrated circuit that includes two RF synthesizers that can be set independently of each other. More particularly, in the embodiment shown in FIG. 4, the synthesizer has an output in the 2450 MHz band, an output in the 915 band, that are selectively switched, and a local oscillator output.

The sections 226 and 227 include buffer amplifiers 240 and 241, respectively, having respective inputs selectively coupled to an RF output of the synthesizer 238 and having respective outputs. More particularly, the reader 230 further includes band select switches 229 and 231, on the board 232, for selecting between the first and second bands. In the illustrated embodiment, the switches 229 and 231 are commonly controlled by a mechanical or electrical switch (not shown). The buffer amps 240 and 241 are coupled to the synthesizer 238 via the switch 229 for selection of one band or the other for transmission. The buffer amplifiers 240 and 241 add isolation.

The sections 226 and 227 further include RF switches 242 and 243, respectively. The RF switch 242 has an input coupled to the output of the buffer amplifier 240 and the RF switch 243 has an input coupled to the output of the buffer amplifier 241. The RF switches 242 and 243 have respective outputs.

The sections 226 and 227 further include power amplifiers 244 and 245, respectively. The power amplifier 244 has an input coupled to the output of the RF switch 242 and has an output. The power amplifier 245 has an input coupled to the output of the RF switch 243 and has an output.

The sections 226 and 227 further include directional RF couplers 246 and 247, respectively. The coupler 246 has an input coupled to the output of the power amplifier 244 and has an output. The coupler 247 has an input coupled to the output of the power amplifier 245 and has an output. Part of the output from the power amplifiers 244 and 245 is coupled off through the directional couplers 246 and 247. Power level is reduced and a signal is provided to respective receive sections for a first downconversion, which will be described below.

The section 226 may further include a second power amplifier 248. If amplification up to a desired level can be obtained using the amplifier 244, the second amplifier 248 can be omitted. The second power amplifier 248 receives the rest of the output from the power amplifier 244, via the coupler 246. The second power amplifier 248 increases power for transmission.

The section 226 further includes a transmit antenna 250 coupled to the second power amplifier 248. The section 227 includes a transmit antenna 251 coupled to the output of the power amplifier 245.

The section 226 includes a receive section 236 and the section 227 includes a receive section 237. Receive sections 236 and 237 include receive antennas 252 and 253, respectively. Individual band antennas are used in the illustrated embodiment.

The receive sections 236 and 237 further include low noise amplifiers 254 and 255, respectively. The amplifier 254 has an input coupled to the antenna 252 and has an output. The amplifier 255 has an input coupled to the antenna 253 and has an output. The low noise amplifiers 254 and 255 boost the signals received by the receive antennas 252 and 253, respectively.

The receive sections 236 and 237 further include 0 degrees splitters 256 and 257, respectively. The splitter 256 has an input coupled to the output of the low noise amplifier 254 and has two outputs. The splitter 257 has an input coupled to the output of the low noise amplifier 255 and has two outputs. The splitters 256 and 257 respectively produce two signals that are in phase.

A 90 degrees splitter 258, on the board 230, has an input coupled to the coupler 246 and has two outputs, 90 degrees apart. The splitter 258 thus produces a phase shift for one of the outputs relative to the input. A 90 degrees splitter 259, on the board 230, has an input coupled to the coupler 247 and has two outputs, 90 degrees apart.

The receive section 236 further includes mixers 260 and 262 having respective inputs and outputs. The mixer 260 receives a signal from one of the outputs of the 90 degree splitter 258 and a signal from one of the outputs of the 0 degrees splitter 256. The mixer 262 receives a signal from the other of the outputs of the 90 degree splitter 258 and a signal from one of the outputs of the 0 degrees splitter 256. In the mixer 260 that gets the two original in-phase signals, the portion of the coupled off transmit signal (the reference signal) and the in-phase receive signal, the output of this mixer is still relatively in-phase with the original transmit signal. In the mixer 262 that gets the portion of the coupled off transmit signal that has been shifted in phase by 90 degrees and the other in phase receive signal, the output of this mixer 262 is 90 degrees off of the other. It either leads or lags the other by 90 degrees.

At the first downconversion mixers 260 and 262, the reflected carrier with the data modulation on it from the tag is mixed with the coupled off portion of the transmit signal. Because the two carriers are essentially the same, they mostly cancel, leaving just the modulation.

Similarly, the receive section 236 further includes mixers 261 and 263 having respective inputs and outputs. The mixer 261 receives a signal from one of the outputs of the 90 degree splitter 259 and a signal from one of the outputs of the 0 degrees splitter 257. The mixer 262 receives a signal from the other of the outputs of the 90 degree splitter 259 and a signal from one of the outputs of the 0 degrees splitter 257.

The section 236 further includes an op-amp 264 selectively coupled to the output of the mixer 260 or 261, via the switch 231. The section 237 further includes an op-amp 266 selectively coupled to the output of the mixer 262 or 263, via the switch 231.

The sections 236 and 237 respectively further include mixers 268 and 270, having respective inputs and outputs. The mixer 268 receives one input signal from the output of the op-amp 264. The mixer 268 receives another input signal from a local oscillator (L.O.) output of the synthesizer 238 via a resistive divider defined by resistors 274, 276, and 278 on the board 232. The mixer 270 receives one input signal from the output of the op-amp 266. The mixer 270 receives another input signal from a local oscillator (L.O.) output of the synthesizer 238, via the resistive divider defined by the resistors 274, 276, and 278 on the board 232. These mixers 268 and 270 are used for upconverting data signals from the op amps 264 and 266, respectively, to a frequency that can be used by demodulators 282 and 284 that will be described below in more detail.

The section 228 further includes a local oscillator 280. In the illustrated embodiment, the local oscillator 280 is a voltage controlled crystal oscillator.

The sections 228 and 237 respectively further include demodulators 282 and 284. The demodulator 282 has an input coupled to the output of the mixer 268, and an input coupled to the local oscillator 280 via, e.g., a resistive divider defined by resistors 286, 288, and 290. The demodulator 284 has an input coupled to the output of the mixer 270, and an input coupled to the local oscillator 280 via, e.g., the resistive divider defined by resistors 286, 288, and 290. In the illustrated embodiment, the demodulators 282 and 284 generate first and second outputs (commonly referred to as I and Q outputs; i.e., in-phase and quadrature outputs). The demodulators 282.and 284 include mixers that are used, in the illustrated embodiment, as down-converters. The demodulators 282 and 284 further produce Received Signal Strength Indicators (RSSI) 296 and 298. The Received Signal Strength Indicator (RSSI) outputs are used, in one embodiment, for dynamic gain control of one or more of: LNA Gain, Receive Gain, Transmit Gain or a combination. In one embodiment, the dynamic gain control is performed by control circuitry 235.

There is 90 degrees of phase difference between the outputs from the demodulators 282 and 284 so that when one channel (I or Q) is in a quadrature null, the other channel is not and has good data on it. In one embodiment, these two outputs are summed or X-OR'ed so that a constant reliable data steam is realized. In one embodiment, the two outputs are summed or X-OR'ed by the control circuitry.

The reader 230 is a portable, handheld reader, and further includes a battery 300 coupled to supply power to components of the board 232. In one embodiment, a housing 302 supports the battery and encloses at least a portion of the circuit board 232. In alternative embodiments, the reader uses AC power (e.g., includes a transformer) and is portable or stationary.

The embodiment shown in FIG. 4 involves a physically larger reader which would have more than double the front end components, but yields higher performance in each band. Again, this embodiment uses broadband antennas, dual band antennas, or individual band antennas that are physically switched out as required by specific applications.

The disclosed designs provide a different approach for RF reader design that allows for excellent performance and sensitivity, small physical size, and low manufacturing costs. One embodiment of the invention provides a design that uses commercially available surface mount parts on a grounded co-planar wave-guide printed circuit board. Previously, various parts were separately packaged and physically large and expensive. These parts and the semi-rigid coaxial method of interconnect made for an even larger physical size of the reader and labor intensive assembly. The circuit design disclosed here advantageously selects and uses commercially available surface mount parts to reduce the size of coaxial interconnects and to keep several related RF parts and processes on one printed circuit board that is about 1/60th the size of a previous reader's RF section. By providing a GCPWG design for an RFID reader, a physically smaller printed circuit board is possible compared to microstrip type printed circuit boards. GCPWG circuits also generate less stray radiated signals and are less susceptible to them.

In compliance with the statute, the invention has been described in language more or less specific as to structural and methodical features. It is to be understood, however, that the invention is not limited to the specific features shown and described, since the means herein disclosed comprise preferred forms of putting the invention into effect. The invention is, therefore, claimed in any of its forms or modifications within the proper scope of the appended claims appropriately interpreted in accordance with the doctrine of equivalents.

What is claimed is:

1. An RFID backscatter interrogator for transmitting data to an RFID tag, generating a carrier for the tag, and receiving data from the tag modulated onto the carrier, the interrogator comprising:

a synthesizer integrated circuit including first and second RF synthesizers having respective synthesizer outputs;

circuitry configured to toggle between the first and second RF synthesizers to effect frequency hopping;

an AM/FM radio demodulator integrated circuit;

an RF mixer, coupled between the synthesizer integrated circuit and the AM/FM radio demodulator integrated circuit, and configured to mix data with a carrier frequency which the AM/FM demodulator integrated circuit is configured to demodulate; and a single grounded-coplanar wave-guide circuit board supporting at least the synthesizer integrated circuit, the AM/FM radio demodulator integrated circuit, and the RF mixer.

2. An RFID backscatter interrogator in accordance with claim 1 and further comprising a battery coupled to the circuit board.

3. An RFID backscatter interrogator in accordance with claim 1 and further comprising a battery coupled to the circuit board, and a housing supporting the battery and enclosing at least a portion of the circuit board.

4. An RFID backscatter interrogator in accordance with claim 1 wherein the RFID interrogator is portable.

5. An RFID backscatter interrogator in accordance with claim 1 wherein the synthesizers of the synthesizer integrated circuit utilize a common reference frequency.

6. An RFID backscatter interrogator in accordance with claim 1 wherein the AM/FM demodulator is an FM band demodulator.

7. An RFID backscatter interrogator in accordance with claim 1 wherein the AM/FM demodulator is a commercially available integrated circuit.

8. An RFID backscatter interrogator in accordance with claim 1 wherein the synthesizer integrated circuit is a commercially available integrated circuit.

9. An RFID backscatter interrogator in accordance with claim 1 and further comprising at least one RF switch coupled to the synthesizer integrated circuit, and at least one RF power amplifier coupled to the RF switch, wherein a transmitter is defined comprising the synthesizer integrated circuit, RF switch, and RF power amplifier.

10. An RFID backscatter interrogator in accordance with claim 1 and further comprising at least one RF switch, supported by the circuit board, coupled to the synthesizer integrated circuit, and at least one RF power amplifier, supported by the circuit board, coupled to the RF switch, wherein a transmitter is defined comprising the synthesizer integrated circuit, RF switch, and RF power amplifier.

11. An RFID backscatter interrogator in accordance with claim 10 and further comprising a low noise amplifier, and circuitry configured to cancel a carrier from a signal received by the low noise amplifier, wherein the power amplifier defines a local oscillator, wherein the circuitry configured to cancel a carrier includes a mixer coupled to the low noise amplifier and to the local oscillator defined by the power amplifier, and wherein a receiver is defined comprising the low noise amplifier, the circuitry configured to cancel the carrier, and the demodulator.

12. An RFID backscatter interrogator in accordance with claim 10 and further comprising a low noise amplifier, supported by the circuit board, and circuitry supported by the circuit board and configured to cancel a carrier from a signal received by the low noise amplifier, wherein the power amplifier defines a local oscillator, wherein circuitry configured to cancel a carrier includes a mixer coupled to the low noise amplifier and to the local oscillator defined by the power amplifier, and wherein a receiver is defined comprising the low noise amplifier, the circuitry configured to cancel the carrier, and the demodulator.

13. An RFID backscatter interrogator for transmitting data to an RFID tag, generating a carrier for the tag, and receiving data from the tag modulated onto the carrier, the interrogator comprising:
 a transmitter including:
  a synthesizer integrated circuit including first and second RF synthesizers having respective synthesizer outputs;
  at least one RF switch coupled to the synthesizer integrated circuit; and
  at least one RF power amplifier coupled to the RF switch, wherein a transmitter is defined comprising the synthesizer integrated circuit, RF switch, and RF power amplifier, the power amplifier defining a local oscillator; and
 a receiver including:
  a low noise amplifier;
  circuitry coupled to the local oscillator defined by the power amplifier and configured to cancel a carrier from a signal received by the low noise amplifier;
  an AM/FM radio demodulator integrated circuit; and
  an RF mixer, coupled between the synthesizer integrated circuit and the AM/FM radio demodulator integrated circuit, and configured to mix data with a carrier frequency which the AM/FM demodulator integrated circuit is configured to demodulate.

14. An RFID backscatter interrogator in accordance with claim 13 and further comprising a single grounded-coplanar wave-guide circuit board supporting both the transmitter and the receiver.

15. An RFID backscatter interrogator in accordance with claim 14 and further comprising a battery coupled to the circuit board, and a housing supporting the battery and enclosing at least a portion of the circuit board.

16. An RFID backscatter interrogator in accordance with claim 13 wherein the RFID interrogator is portable.

17. An RFID backscatter interrogator in accordance with claim 13 wherein the AM/FM demodulator is an FM band demodulator.

18. An RFID backscatter interrogator in accordance with claim 14 and further comprising a battery coupled to the circuit board.

19. An RFID backscatter interrogator in accordance with claim 13 and further comprising a single grounded-coplanar wave-guide circuit board supporting at least the synthesizer integrated circuit, the AM/FM radio demodulator integrated circuit, and the RF mixer.

20. An RFID backscatter interrogator for transmitting data to an RFID tag, generating a carrier for the tag, and receiving data from the tag modulated onto the carrier, the interrogator comprising:
 a synthesizer integrated circuit including first and second RF synthesizers having respective synthesizer outputs;
 an AM/FM radio demodulator integrated circuit; and
 an RF mixer, coupled between the synthesizer integrated circuit and the AM/FM radio demodulator integrated circuit, and configured to mix data with a carrier frequency which the AM/FM demodulator integrated circuit is configured to demodulate.

21. An RFID backscatter interrogator in accordance with claim 20 and further comprising a low noise amplifier, and circuitry configured to cancel a carrier from a received signal to produce a carrier-removed signal, the carrier-removed signal being coupled to the demodulator.

22. An RFID backscatter interrogator in accordance with claim 21 wherein the circuitry further includes a mixer configured to mix the output of the local oscillator with the carrier-removed signal to produce a data signal, the data signal being provided to the demodulator.

23. An RFID backscatter interrogator in accordance with claim 20 wherein the RFID interrogator is portable.

24. An RFID backscatter interrogator in accordance with claim 20 wherein the three synthesizers of the synthesizer integrated circuit all utilize a common reference frequency.

25. An RFID backscatter interrogator in accordance with claim 20 wherein the AM/FM demodulator is an FM band demodulator.

26. An RFID backscatter interrogator in accordance with claim 20 and further comprising at least one RF switch coupled to the synthesizer integrated circuit, and at least one RF power amplifier coupled to the RF switch, wherein a transmitter is defined comprising the synthesizer integrated circuit, RF switch, and RF power amplifier.

27. An RFID backscatter interrogator in accordance with claim 20 and further comprising a low noise amplifier, circuitry coupled to the at least one power amplifier and configured to cancel a carrier from a signal received by the low noise amplifier, and wherein a receiver is defined comprising the low noise amplifier, the circuitry configured to cancel the carrier, and the demodulator.

28. An RFID backscatter interrogator for transmitting data to an RFID tag, generating a carrier for the tag, and receiving data from the tag modulated onto the carrier, the interrogator comprising:
 a synthesizer integrated circuit including first and second RF synthesizers having respective synthesizer outputs;
 circuitry configured to toggle between the first and second RF synthesizers to effect frequency hopping; and
 a single grounded-coplanar wave-guide circuit board supporting at least the synthesizer integrated circuit, the AM/FM radio demodulator integrated circuit, and the RF mixer.

29. An RFID backscatter interrogator in accordance with claim 28 and further comprising a battery coupled to the circuit board.

30. An RFID backscatter interrogator in accordance with claim 28 and further comprising a battery coupled to the circuit board, and a housing supporting the battery and enclosing at least a portion of the circuit board.

31. An RFID backscatter interrogator in accordance with claim 28 wherein the RFID interrogator is portable.

32. An RFID backscatter interrogator in accordance with claim 28 wherein the synthesizers of the synthesizer integrated circuit utilize a common reference frequency.

33. An RFID backscatter interrogator in accordance with claim 28 and further comprising at least one RF switch coupled to the synthesizer integrated circuit, and at least one RF power amplifier coupled to the RF switch, wherein a transmitter is defined comprising the synthesizer integrated circuit, RF switch, and RF power amplifier.

34. An RFID backscatter interrogator in accordance with claim 28 and further comprising at least one RF switch, supported by the circuit board, coupled to the synthesizer integrated circuit, and at least one RF power amplifier, supported by the circuit board, coupled to the RF switch, wherein a transmitter is defined comprising the synthesizer integrated circuit, RF switch, and RF power amplifier.

35. An RFID backscatter system comprising:
an interrogator for transmitting data to an RFID tag, generating a carrier for the tag, and receiving data from the tag modulated onto the carrier, the interrogator comprising a single grounded-coplanar wave-guide circuit board, a synthesizer integrated circuit supported by the circuit board, the synthesizer being configured for frequency hopping, a demodulator integrated circuit supported by the circuit board, and an RF mixer supported by the circuit board, coupled between the synthesizer integrated circuit and the demodulated integrated circuit, and configured to mix data with a carrier frequency which the demodulator integrated circuit is configured to demodulate; and
a tag in selective backscatter communication with the interrogator.

36. An RFID backscatter system in accordance with claim 35 and comprising a synthesizer integrated circuit supported by the circuit board, the synthesizer integrated circuit including independently configurable first and second RF synthesizers having respective synthesizer outputs.

37. A dual band RFID backscatter interrogator for transmitting data to an RFID tag, generating a carrier for the tag, and receiving data from the tag modulated onto the carrier, the interrogator comprising:
a transmitter including:
a synthesizer integrated circuit including first and second RF synthesizers having respective synthesizer outputs;
a first section configured for transmission at a first frequency, including:
at least one RF switch switchably coupled to the synthesizer integrated circuit; and
at least one RF power amplifier coupled to the RF switch, wherein a transmitter is selectively defined including the synthesizer integrated circuit, RF switch, and RF power amplifier;
a second section configured for transmission at a second frequency different from the first frequency, including:
at least one RF switch switchably coupled to the synthesizer integrated circuit; and
at least one RF power amplifier coupled to the RF switch of the second section, wherein a transmitter is selectively defined including the synthesizer integrated circuit, RF switch of the second section, and RF power amplifier of the second section; and
a receiver including:
a third section configured for receiving backscatter at the first frequency, including:
a low noise amplifier;
circuitry coupled to the at least one power amplifier of the first section and configured to cancel a carrier from a signal received by the low noise amplifier;
an AM/FM radio demodulator integrated circuit; and
an RF mixer, coupled between the synthesizer integrated circuit and the AM/FM radio demodulator integrated circuit, and configured to mix data with a carrier frequency which the AM/FM demodulator integrated circuit is configured to demodulate; and
a fourth section configured for receiving backscatter at the second frequency, including:
a low noise amplifier;
circuitry coupled to the at least one power amplifier of the second section and configured to cancel a carrier from a signal received by the low noise amplifier of the fourth section;
an AM/FM radio demodulator integrated circuit; and
an RF mixer, coupled between the synthesizer integrated circuit and the AM/FM radio demodulator integrated circuit of the fourth section, and configured to mix data with a carrier frequency which the AM/FM demodulator integrated circuit of the fourth section is configured to demodulate.

38. A dual band RFID backscatter interrogator in accordance with claim 37 and further comprising switching circuitry for selectively switching between the first and second sections.

39. A dual band RFID backscatter interrogator in accordance with claim 38 and further comprising switching circuitry for selectively switching between the third and fourth sections.

40. A dual band RFID backscatter interrogator in accordance with claim 37 and further comprising a single grounded-coplanar wave-guide circuit board supporting both the transmitter and the receiver.

41. A dual band RFID backscatter interrogator in accordance with claim 40 and further comprising a battery coupled to the circuit board, and a housing supporting the battery and enclosing at least a portion of the circuit board.

42. A dual band RFID backscatter interrogator in accordance with claim 37 wherein the RFID interrogator is portable.

43. A dual band RFID backscatter interrogator in accordance with claim 37 wherein each AM/FM demodulator is an FM band demodulator.

44. A dual band RFID backscatter interrogator in accordance with claim 40 and further comprising a battery coupled to the circuit board.

45. A dual band RFID backscatter interrogator in accordance with claim 37 and further comprising a single grounded-coplanar wave-guide circuit board supporting at least the synthesizer integrated circuit, each AM/FM radio demodulator integrated circuit, and each RF mixer.

46. A dual band RFID backscatter interrogator for transmitting data to an RFID tag, generating a carrier for the tag, and receiving data from the tag modulated onto the carrier, the interrogator comprising:
a transmitter including:
a synthesizer integrated circuit including first and second RF synthesizers having respective synthesizer outputs and used in operation for communication in a selected one of at least first and second RF bands;
at least one RF switch coupled to the synthesizer integrated circuit; and at least one RF power amplifier coupled to the RF switch, wherein a transmitter is defined comprising the synthesizer integrated circuit, RF switch, and RF power amplifier; and a receiver including:
- a low noise amplifier;
- circuitry coupled to the at least one power amplifier and configured to cancel a carrier from a signal received by the low noise amplifier;
- an AM/FM radio demodulator integrated circuit; and
- an RF mixer, coupled between the synthesizer integrated circuit and the AM/FM radio demodulator integrated circuit, and configured to mix data with a carrier frequency which the AM/FM demodulator integrated circuit is configured to demodulate;

wherein the at least one RF switch, at least one RF power amplifier, low noise amplifier, circuitry configured to cancel a carrier, RF mixer, and AM/FM demodulator are broadbanded to cover the at least first and second bands.

47. A dual band RFID backscatter interrogator in accordance with claim 46 and further comprising a single grounded-coplanar wave-guide circuit board supporting both the transmitter and the receiver.

48. A dual band RFID backscatter interrogator in accordance with claim 47 and further comprising a battery coupled to the circuit board, and a housing supporting the battery and enclosing at least a portion of the circuit board.

49. A dual band RFID backscatter interrogator in accordance with claim 46 wherein the RFID interrogator is portable.

50. A dual band RFID backscatter interrogator in accordance with claim 46 wherein the AM/FM demodulator is an FM band demodulator.

51. A dual band RFID backscatter interrogator in accordance with claim 47 and further comprising a battery coupled to the circuit board.

52. A dual band RFID backscatter interrogator in accordance with claim 46 and further comprising a single grounded-coplanar wave-guide circuit board supporting at least the synthesizer integrated circuit, the AM/FM radio demodulator integrated circuit, and the RF mixer.

* * * * *

UNITED STATES PATENT AND TRADEMARK OFFICE
CERTIFICATE OF CORRECTION

| | | |
|---|---|---|
| PATENT NO. | : 7,155,172 B2 | Page 1 of 1 |
| APPLICATION NO. | : 10/269756 | |
| DATED | : December 26, 2006 | |
| INVENTOR(S) | : Scott | |

It is certified that error appears in the above-identified patent and that said Letters Patent is hereby corrected as shown below:

Title Page,
Item (56) References Cited, U.S. Patent Documents – Replace "2,349,332 A" with --5,349,332 A--.

Title Page,
Item (56) References Cited – Insert --Foreign Patent Documents
EP 0592781 04/1994
DE 4339669 05/1995--.

Column 9, Line 40 – Replace "Cailf." with --Calif.--.

Signed and Sealed this

Twenty-first Day of August, 2007

JON W. DUDAS
*Director of the United States Patent and Trademark Office*